US008065276B2

(12) United States Patent
Pudipeddi et al.

(10) Patent No.: US 8,065,276 B2
(45) Date of Patent: *Nov. 22, 2011

(54) SYSTEM AND METHOD FOR DATA MIGRATION

(75) Inventors: Ravisankar Pudipeddi, Redmond, WA (US); Ran Kalach, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 347 days.

This patent is subject to a terminal disclaimer.

(21) Appl. No.: 11/872,518

(22) Filed: Oct. 15, 2007

(65) Prior Publication Data

US 2008/0040393 A1 Feb. 14, 2008

Related U.S. Application Data

(60) Division of application No. 10/935,789, filed on Sep. 8, 2004, now Pat. No. 7,284,015, which is a continuation of application No. 09/783,787, filed on Feb. 15, 2001, now Pat. No. 6,889,232.

(51) Int. Cl.
*G06F 17/00* (2006.01)

(52) U.S. Cl. .................................... 707/661; 711/161

(58) Field of Classification Search .............. 707/609, 707/640, 661, 675, 705, 802; 711/103, 111, 711/161, 170; 369/30.31, 30.35
See application file for complete search history.

(56) References Cited

U.S. PATENT DOCUMENTS

| | | | | |
|---|---|---|---|---|
| 5,226,141 A * | 7/1993 | Esbensen | .................... | 711/171 |
| 5,247,660 A | 9/1993 | Ashcraft et al. | .................... | 395/600 |
| 5,499,233 A * | 3/1996 | Childers et al. | .................... | 720/729 |
| 5,537,585 A * | 7/1996 | Blickenstaff et al. | .................... | 707/205 |
| 5,584,018 A * | 12/1996 | Kamiyama | .................... | 711/165 |
| 5,758,184 A * | 5/1998 | Lucovsky et al. | .................... | 710/6 |
| 5,802,020 A | 9/1998 | Kaneko et al. | .................... | 369/34 |
| 6,115,339 A * | 9/2000 | Winarski | .................... | 369/53.2 |
| 6,480,971 B1 * | 11/2002 | Matsumoto et al. | .................... | 714/8 |
| 6,493,787 B1 | 12/2002 | Yamamoto et al. | .................... | 711/100 |
| 6,889,232 B2 | 5/2005 | Pudipeddi et al. | .................... | 707/200 |

(Continued)

OTHER PUBLICATIONS

Colwell, S., "The world of hierarchical storage management," *BYTE*, 1996, 21(8).
Cordrey, V., et al., "Moving large file systems on-line, including existing HSM filesystems," *13th Systems Administration Conf. (LISA '99)*, 1999, 187-196.

(Continued)

*Primary Examiner* — Fred I Ehichioya
(74) *Attorney, Agent, or Firm* — Woodcock Washburn LLP

(57) ABSTRACT

A method for concurrent data migration includes classifying files to be migrated into plural jobs, selecting media to which to migrate each job, and using plural drives concurrently to write the jobs to the media. The selection of a medium is performed in a way that prevents the number of writeable media from exceeding the number of available drives, unless no allocated medium has sufficient space to store any files in a migration job. A medium is preferentially selected that has already been allocated for writing, has space to store at least one file in the job, is not in use for another job, and can be robotically mounted on a drive. If such a medium does not exist, then the set of available media is canvassed to locate an alternative medium. The attributes of each medium are evaluated to determine which medium can be selected most consistently with the goals of (1) preventing the number of media from exceeding the number of drives, and (2) providing sufficient media to allow plural drives to be used concurrently. The technique can be embodied in a file management environment that transparently migrates files meeting certain criteria and stores the location of the migrated file in a reparse point provided by the file system.

13 Claims, 11 Drawing Sheets

U.S. PATENT DOCUMENTS 7,284,015 B2 10/2007 Pudipeddi et al.
2005/0108710 A1* 5/2005 Patiejunas .................... 718/100

OTHER PUBLICATIONS

Hurley, R.T., et al., "File migration and file replication: a symbiotic relationship," *IEEE Transactions on Parallel and Distributed Systems*, 1996, 7(6).

Klostermeyer, W., "Scheduling process and file migrations in a distributed system," *Sixth Annual Conf. on Parallel and Distributed Computing Systems*, Kumar, A., et al. (Eds.), 1993, 9-13.

Rothwell, P., "Storage capacity problems and solutions," *Network Computing*, 1995, 4(10), 34-37.

Transcription of Dialog Web Abstract for Clark, A. "Hierarchical storage management," *Network News* (*UK Ed.*), 1998.

* cited by examiner

SYSTEM AND METHOD FOR DATA MIGRATION

CROSS-REFERENCE TO RELATED CASES

This is a divisional of U.S. application Ser. No. 10/935,789 filed Sep. 8, 2004 entitled "System and Method for Data Migration now U.S. Pat. No. 7,284,015, which is a continuation of U.S. patent application Ser. No. 09/783,787 filed Feb. 15, 2001 now U.S. Pat. No. 6,889,232 issued May 3, 2005 which are incorporated herein in their entirety.

FIELD OF THE INVENTION

This invention relates generally to the field of computing and, more particularly, to a system and method for migrating data to media such as tapes or removable disks.

BACKGROUND OF THE INVENTION

In computing systems that employ a mass storage device (such as a hard disk) for the storage of data objects (e.g., files), it is often the case that data objects stored on the mass storage device are "migrated" to backup media (e.g., a tape, a writeable optical disk, etc.) in order to make room for new data in mass storage. In performing the migration, one issue that arises is the effective use of backup media in a manner that efficiently exploits the physical properties of the migration system and of the media itself. Examples of such physical properties are: the availability of more than one drive to write plural media concurrently, the presence of a "juke box" (a device that stores a library of "near-line" media that can be mounted and dismounted on drives by a robot without human intervention), and the double-sided nature of certain media.

For example, when plural drives are available to read different media concurrently, it may be undesirable to use only a single medium because doing so fails to exploit the time efficiency that could be realized by using extra drives concurrently. However, allocation of too many media is also undesirable, because of the cost of additional media, as well as the additional time that it takes to mount and dismount numerous media onto and off of the drives. Other considerations that can affect efficiency are the different amount of time that it takes to mount "near-line" media (as compared with "off-line" media stored outside a juke box library), and the presence of double-sided media (which have the advantage that they can store more data on one medium than can be stored on a similar single-sided medium, but also have the disadvantage that one side of the medium is unavailable when the medium is mounted on a drive on the other side).

While migration systems exist that are capable of storing migrated data on media, they do not provide efficient uses of media, plural drives, juke boxes, and double-side properties in view of the considerations outlined above. The present invention overcomes the limitations and drawbacks of the prior art.

SUMMARY OF THE INVENTION

The invention provides a technique for managing migration jobs in a manner that efficiently uses hardware and media. The invention may be deployed in any migration system, although it is particularly useful in systems having plural drives, a "juke box" for the storage of near-line media, double-sided media, or a combination of those features.

The technique of the present invention seeks to optimize the migration process by "allocating" (i.e., designating as ready to receive migrated data) a number of backup media, where the number of allocated media is as close as possible to the number of drives that are available to write media. A number called "migration concurrency," M, is defined, which represents the maximum number of drives that may concurrently write media. M may be equal to the number of physical drives connected to the system, or it may be lower (e.g., in the case where a certain number of drives are reserved for non-migration uses).

In using the technique of the present invention, data objects are selected for migration according to a paradigm. An example of such a paradigm is "migrate all files that have not been used for six months." The selected objects are organized into "jobs." A "job" is a grouping of data objects that are to be migrated. For example, if data objects are files in the MICROSOFT WINDOWS operating system, then each job may correspond to all of the selected files from a particular volume (e.g., job 1 includes all selected files from volume C:, and job 2 includes all selected files from volume D:). Jobs are migrated concurrently when plural drives are available. Jobs that are presently being processed (i.e., migrated to media) are said to be "active," and jobs that are waiting to be migrated are "non-active." Thus, M is effectively an upper limit on the number of jobs that can be active at any one time.

If the number of active jobs is equal to M, then no new jobs can be activated, and any new jobs that are received are queued to wait for a drive and a medium. If the number of active jobs is less than M, then new jobs can be activated. In order to migrate jobs concurrently using plural drives, however, plural media must be allocated for writing, since a medium can only be mounted on one drive at a given time. Thus, when a new job is activated, a medium must be located on which to write the migrated data. Initially, a search is made to determine whether an allocated medium is available near-line (or in a drive) that has space to store the migrated data, and is not presently "busy" (i.e., is not currently being used for migration or recall). If such a medium exists, then its second side is allocated and used for the newly activated job.

If, however, no such medium exists, then a search is made for another medium according to the following algorithm. First, an attempt is made to locate a near-line non-busy medium whose first side is full. If such a medium exists, it is allocated and used for the newly activated job. If no such media exists, then the allocation of media depends on whether the number of media presently allocated for writing, W, is less than M. If W<M, then an unallocated (i.e., "blank") medium is selected from the juke box library, or, if no unallocated media are in the library, then the operator is prompted to insert a new medium. On the other hand, if W>=M, then the operator is prompted to add a presently allocated off-line medium to the library that has sufficient free space, if such a medium exists. If no such medium exists, then the system attempts to locate a medium that is currently busy but has sufficient free space. If such a medium exists, the system proceeds to wait for that medium to become non-busy. If none of these alternative media exist, then the system allocates a new medium for writing. Once a medium has been selected, the job is written to the selected medium. The technique thus attempts to keep W<=M, but allows W to exceed M if no allocated medium has sufficient space for an active job, or if M is reduced dynamically during the operation of the system.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF ILLUSTRATIVE EMBODIMENTS

Overview

Many computer systems include a hard disk, or other long-term storage device, as a primary means for long-term storage of files or other data. When the disk becomes full, it may be necessary to "migrate" certain data to a backup medium such as a tape or an optical disk. When the computer system has more than one media drive available, plural drives may be used to migrate different groups of data to media concurrently, thereby reducing the total time required to perform the migration.

Exemplary Computing Environment

Figure 1:
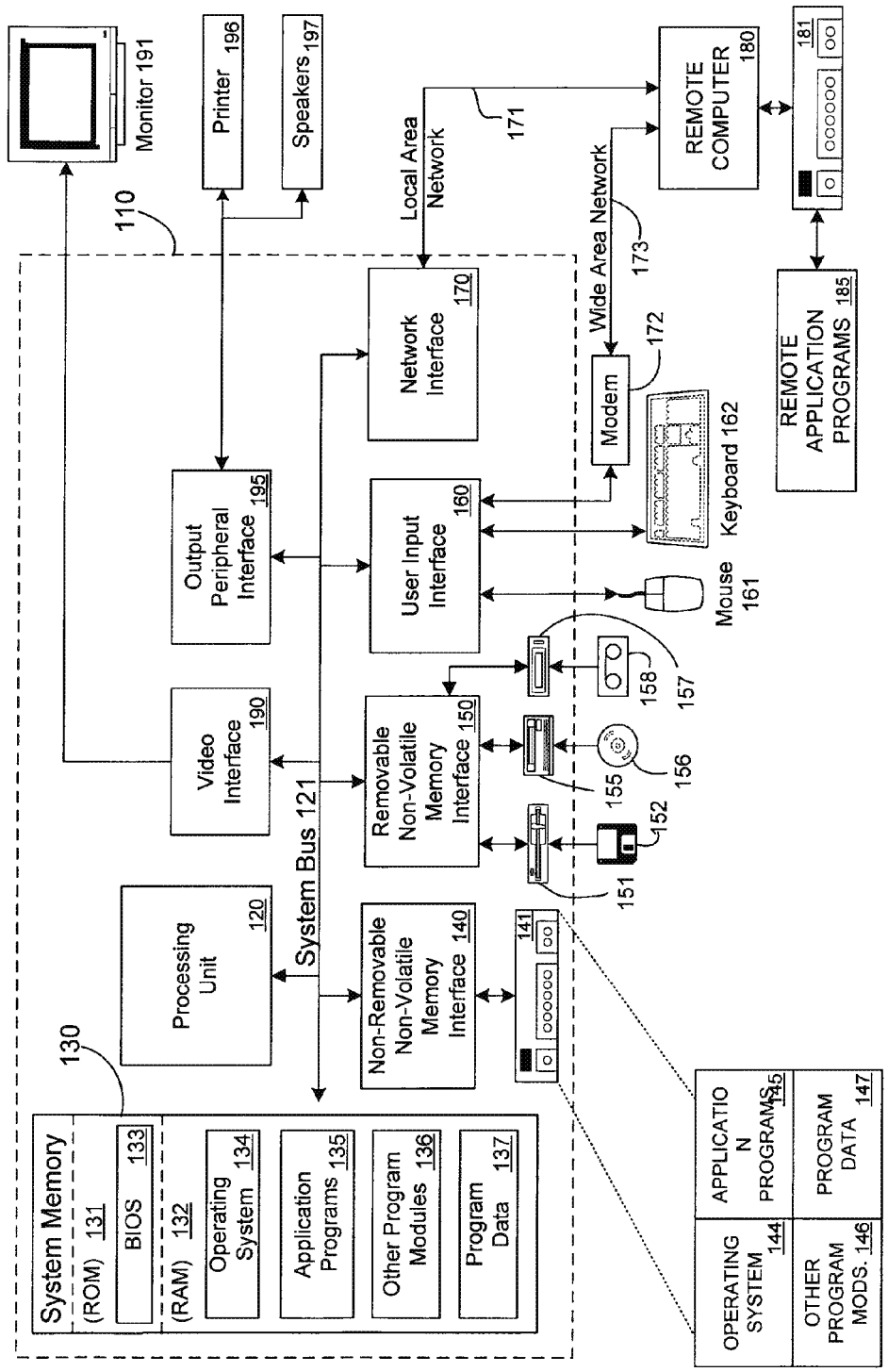
FIG. 1 is a block diagram of an exemplary computing environment in which aspects of the invention may be implemented.

FIG. 1 illustrates an example of a suitable computing system environment 100 in which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, an optical disk drive 155 that reads from or writes to a removable, nonvolatile optical disk 156, such as a CD ROM or other optical media, and a sequential media drive 157 that reads from or write to a removable, nonvolatile sequential medium 158, such as a magnetic tape cassette or reel-to-reel tape. Other removable/non-removable, volatile/nonvolatile computer storage media that can be used in the exemplary operating environment include, but are not limited to, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Data Migration Environment

Figure 2:
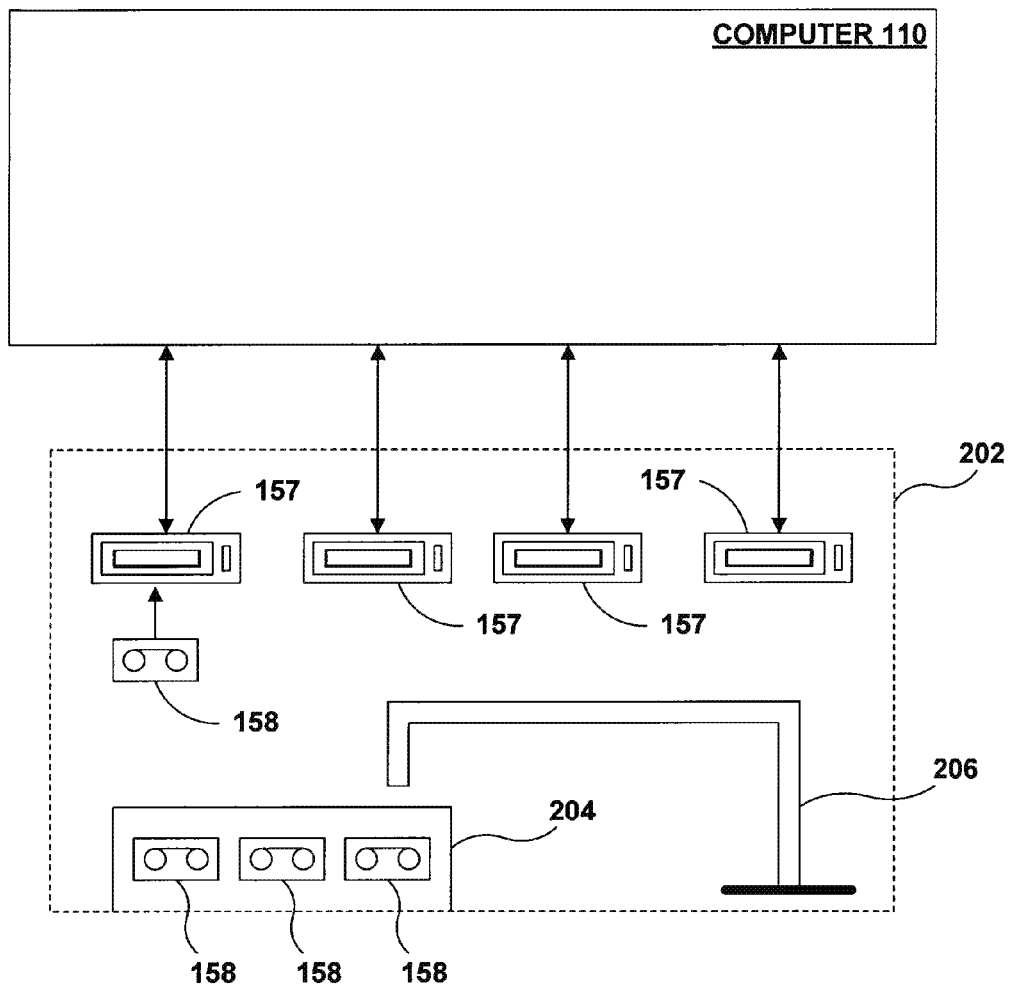
FIG. 2 is a block diagram of an exemplary data migration environment having a computing device communicatively connected to one or more media drives.

FIG. 2 shows an exemplary environment in which migrated data may be stored on backup media. Computer 110 may be communicatively connected to one or more media drives. FIG. 2 shows computer 110 connected to a plurality of media drives 157, which are capable of reading data from media 158 and communicating that data back to computer 110. FIG. 2 depicts media drives 157 and media 158 as tape drives and magnetic cassette tapes, respectively. Tape media, however, is merely exemplary and is not limiting of the invention. The environment shown in FIG. 2 could, as an alternative example, include magnetic disk drives 151 for use with magnetic disks 152 (shown in FIG. 1), optical disk drives 155 for use with optical disks 156 (also shown in FIG. 1), or any other type of media-reading device for use with appropriate data storage media.

Media drives 157 are preferably configured to work with "removable" media, such that a given medium 158 can be mounted or dismounted from drive 157. A media drive 157 may, at any given time, have a particular medium 158 mounted on it, or it may be "empty" (i.e., no medium 158 presently mounted on the drive). By way of example, FIG. 2 shows one media drive 157 (the leftmost media drive 157 in FIG. 2) having a medium 158 mounted thereon, and three other media drives 157 have no media mounted thereon.

Media drives 157 may be included within, or may be associated with, a "juke box" 202. Juke box 202 stores a library 204 of media 158 in a "near-line" position such that media 158 in library 204 can be mounted and dismounted by machine without human intervention. Juke box 202 includes robotic arm 206, which mounts media onto (and dismounts media from) media drives 157. While juke box 202 is a convenient device for storing, mounting, and dismounting media 158, juke box 202 is optional, and the invention applies to any environment having one or more media drives 157, whether or not media drives 157 or media 158 are associated with juke box 202.

Media 158 are generally used to store "migrated" data. In a typical example, media 158 are used to store files that have been "migrated" (i.e., moved off of) a primary storage device (such as hard disk 141 shown in FIG. 1) in order to free up space for new data on the primary storage device. For example, a storage management program on computer 110 (which may, for example, be part of operating system 134) may target files on hard disk 141 that have not been accessed for some predetermined period of time (e.g., six months). The targeted files may be migrated to media 158 by deleting the files from hard disk 141 and copying them to one or more media 158. A "stub" that identifies the new location of each file may be retained on hard disk 141 so that the file can be located later. While old or rarely-used files are a common type of data that are stored on media 158, it should be understood that such files are not limiting of the invention. Rather, the invention may be used to migrate any type of data that may be stored on media 158, regardless of whether the data is organized into files, and regardless of the reasons for which the data is being migrated to media 158.

Media Attributes

Media have various attributes. As further discussed below (in connection with FIGS. 7-9), the attributes of media are used in accordance with the invention to determine whether to use a particular medium for migration. Before discussing how these attributes are used to make such decisions, the nature of the attributes themselves will be described.

Figure 3A:
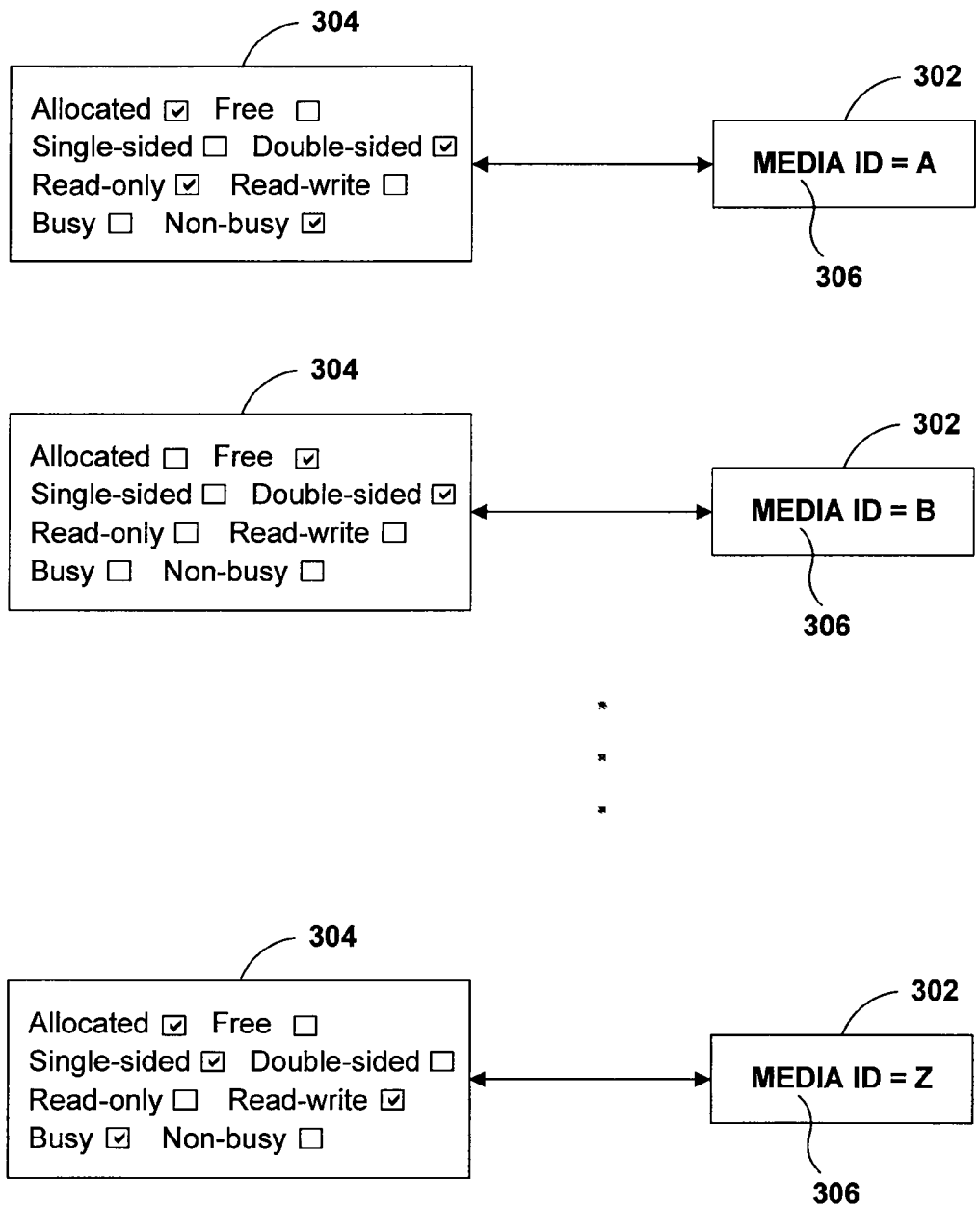
FIG. 3A is a block diagram showing a plurality of media having attributes in accordance with aspects of the invention.

FIG. 3A shows a plurality of media 302. Each medium is uniquely identified by a "media ID" 306 (shown as "A", "B", . . . , "Z" in FIG. 3). Each medium 302 is associated with a particular set of attributes 304. Media 302 can be any type of media that are capable of storing data, such as magnetic disk 152, optical disk 156, or magnetic tape 158 (shown in FIG. 1). It should further be noted that media 302 need not all be the same type of media. For example, one medium 302 may be an optical disk 156, while another medium 302 may be a magnetic tape 158. However, it is preferable that all media 302 available for migration be of a single type so that they can be stored within juke box 202 and used interchangeably within the drives of juke box 202.

As noted above, each medium 302 has a set of attributes 304 associated with it. In the example of FIG. 3A, each medium 302 is classified as being "allocated" or "free." A "free" medium is one that can be written onto as if it were a "clean slate." An example of a "free" medium is one that has never been used (i.e., a "blank" medium). Another example of a "free" medium is one that has been previously used, but for which it has been determined that the data it contains is no longer needed; while such a medium is not blank, it can be written upon as if it were blank. An "allocated" medium is one that is presently designated for reading and/or writing. For example, after a free medium has been designated for writing new data, it becomes "allocated." As another example, a medium that has been written onto and has become "full" is also "allocated". Such a medium is no longer available for writing, but it is still needed for reading and is therefore not "free."

Each allocated medium 302 is further classified as being either "read-only" or "read/write." A read/write medium is one that has space available into which new data can be written. A read-only medium is one that is full, or that has otherwise been designated as being unavailable for writing. The read-only or read/write designation is not static, but rather changes throughout time. For example, a medium may be read/write when first allocated, but then becomes read-only after it has been filled with data. Only allocated media are classified as read-only or read/write. Free media have not yet been designated for any particular use and therefore are not classified as being read-only or read/write.

Each allocated medium 302 is further classified as being either busy or non-busy. A busy medium is one that is presently mounted on a drive (e.g., drives 151, 155, or 157 shown in FIG. 1) and is being used for either writing or reading of data. A non-busy medium is one that is not being used for the reading or writing of data. Such a medium may be in library 204 (shown in FIG. 2), mounted on a drive (but idle), or off-line. "Off-line," in this context, means that the medium is in a location where cannot be mounted by robotic arm 206, but can otherwise be accessed (e.g., by a human being). Only allocated media are classified as being busy or non-busy. Free media have not been designated for either reading or writing and, therefore, are never in use. In this sense, all free media are "non-busy," but it is not necessary to classify them as such.

Figure 3B:
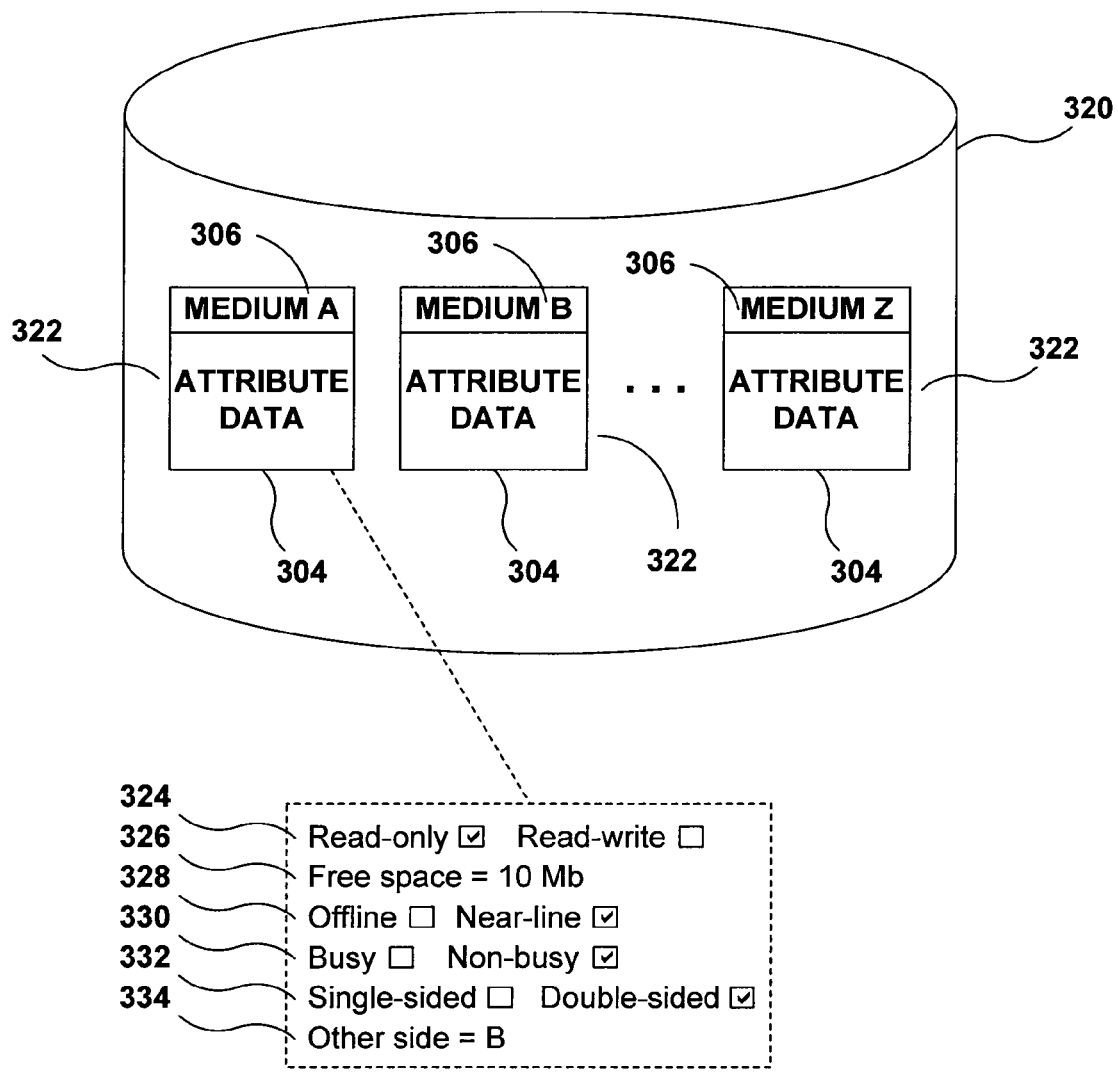
FIG. 3B is a block diagram showing the attributes of FIG. 3A stored in a database.

Finally, each medium 302 is classified as being either single-sided or double-sided. All media are so classified, whether they are allocated or free. Certain types of media (e.g., certain disks) are double-sided in that they are capable of being mounted on either side. In a sense, each side can be considered a separate medium, since it is not possible to access both sides at the same time. In fact, it may be the case that each medium 302 shown in FIG. 3A actually refers to a particular side of a double-sided medium—i.e., a physical disk may be viewed as two different media 302 for the purpose of assigning attributes 304 to each side of the medium. However, the two sides of a double-sided medium differ from two physically separate media in one important respect: two physically separate media can be simultaneously mounted in separate drives, but it is never possible to mount both sides of a double-sided medium at the same time. Thus, even if a first side of a double-sided medium is allocated and non-busy, it is not possible to mount the first side of that medium if the second side of the same medium is busy. For this reason, it is useful to note the attribute of whether a medium is single-sided or double-sided. In the case of a double-sided medium, each side generally has its own media ID 306, and the attributes 304 of each side provide a cross-reference to the other side of the same physical medium (as shown in FIG. 3B). In the example of FIG. 3A, the media 302 identified by media IDs "A" and "B" may be the different sides of the same double-sided physical medium.

The attributes 304 of media 302 may be stored in a database 320, as shown in FIG. 3B. Each entry 322 in database 320 corresponds to an allocated medium 302. Preferably, only allocated media are represented by entries 322 in database 320, and free media are not represented in database 320. A new entry 322 may be created for a medium 302 at the time that the medium becomes allocated.

Each entry 322 may include the media ID 306 for the medium to which the entry relates. Entries 322 in database 302 may be indexed by media ID 306, such that each entry can be located by its media ID 306.

Each entry 322 also includes the various attributes 304 of media 302, and related information. In the example of FIG. 3B, an entry 322 includes a field 324 that indicates whether the medium is read-only or read/write. For each read/write medium 302, a field 326 contains the amount of free space left to write on the medium 302. Each entry 322 further contains a field 328 indicating whether the medium is off-line or near-line. The classification of off-line or near-line applies to systems employing juke box 202, in which an important distinction can be made between unmounted media that are in library 204 (and thus can be mounted by robotic arm 206 without human intervention), and media that are in human-accessible storage (but require mounting by a human operator). An additional field 330 indicates whether the medium 302 is presently busy or non-busy. As noted above, busy media are media that are presently mounted in a drive and are being used for reading or writing; media that are not mounted, or that are not presently in use, are non-busy. Another field 332 indicates whether the medium is single-sided or double-sided. As noted above, each side of a double-sided medium has its own media ID 306, and, in the case of double-sided media, field 334 indicates the media ID of the other side of the physical medium.

Data Migration Process

A function of media 302 is to receive "migrated" data. "Migration" is the process by which data is moved from one data storage device to another. A typical example of migration is the case in which old files on a hard disk (e.g., hard disk 141 shown in FIG. 1) that have not been accessed for a long time are transferred from the hard disk to backup media in order to free up space on the hard disk for new data. The underlying assumption of performing such migration is that files that have not been accessed for a long time (e.g., six months) are not likely to be needed in the future. Thus, such files can safely be stored in a backup location (e.g., tape 158 shown in FIG. 1), where they are not as easily accessible as if they remained on hard disk 141, but can be recalled if the need arises. It should be understood that files are merely exemplary of the type of data objects that can be "migrated." Other example of such data objects include database records, data containers, or other units of data whether or not such data is organized into "files."

The migration process is described below in connection with FIG. 5. Before that process is described in detail, it is important to note that one feature of the invention is the ability to migrate groups of data in parallel. As noted in connection with FIG. 2, many computer systems are associated with plural media drives, and thus it may be possible to migrate different groups of data concurrently by mounting different media on the plural drives and writing to those media at the same time. However, the number of media that can be written at the same time is limited by the number of drives that are available for migration. It is useful, therefore, to define a number called the "migration concurrency," M, which represents the maximum number of media drives that are available for migration. M may be the actual number of drives associated with the computing device, or it may be a lower number. For example, the system may be connected to four drives, but the system administrator may designate one drives as being reserved for non-migration purposes, in which case M=3.

Moreover, the migration process itself involves two phases, which can be characterized as "active" and "non-active." The "active" phase comprises those actions that require a drive—e.g., the mounting of an appropriate medium onto the drive, the writing of data onto the medium, etc. The non-active phase comprises those portions of the process—e.g., the identification of data to migrate—that can be performed regardless of whether a drive is available. Each instance of the migration process is called a "migration job," or, simply, a "job." Thus, the process that is described below can be run concurrently in multiple instances, with each instance being a "job," and each job having either "active" or "non-active" status. Since the "active" phase of a job requires a drive, the migration concurrency M is essentially a limit on the number of jobs that can be active at any given time. In this regard, it is useful to define two more parameters: the total number of jobs, J; and, the number of jobs that are actually active at the present time, E. The parameter J includes all active and non-active jobs. The parameter E includes only the active jobs. In general, E is equal to the migration concurrency M, although it may at times be less—for example, when there are no non-active jobs pending, or for the brief period of time after one active job has completed but before a non-active job can be activated.

Figure 4:
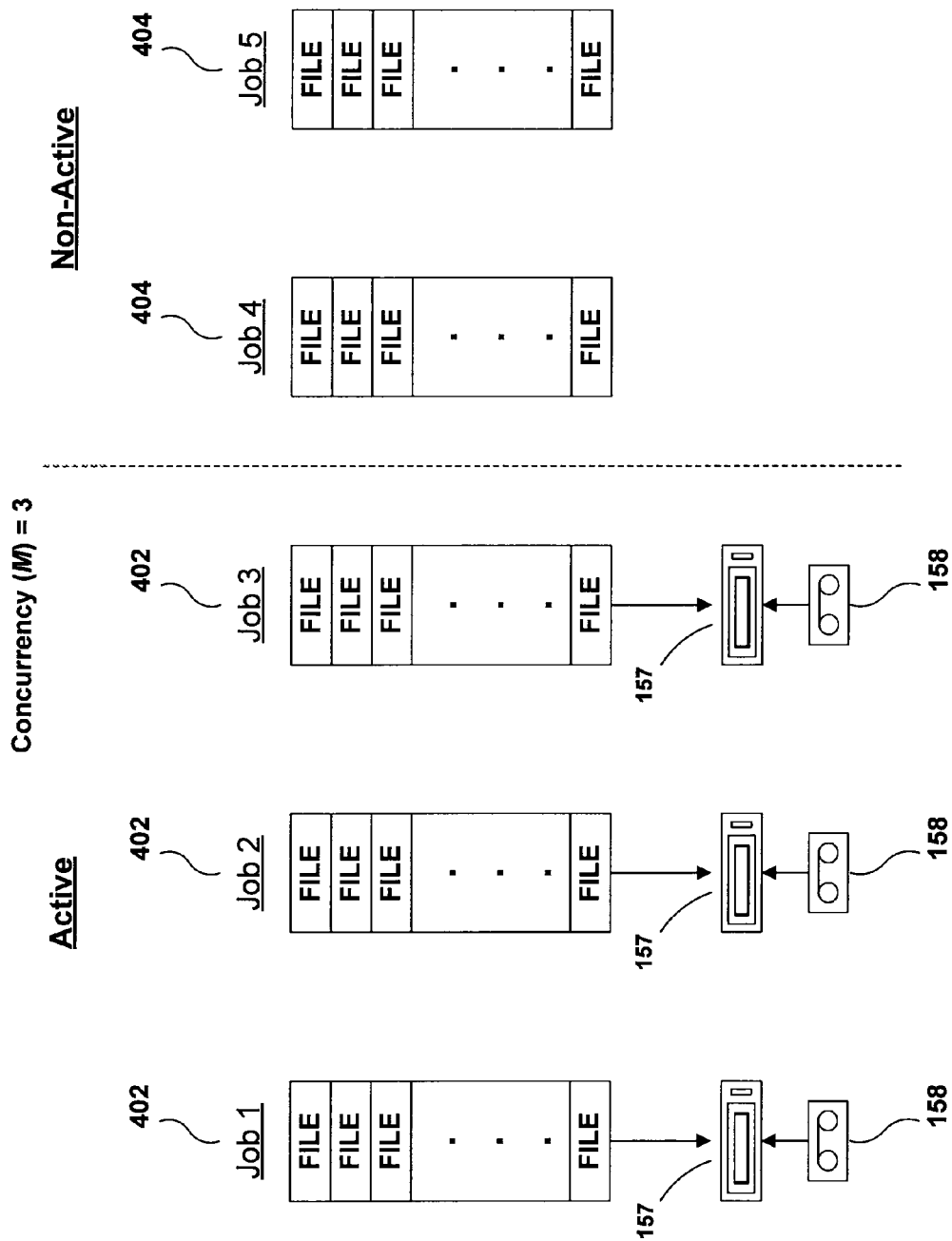
FIG. 4 is a diagram showing a plurality of active and non-active migration jobs.

FIG. 4 depicts in graphical form the distinction between active and non-active jobs. In the example of FIG. 4, the migration concurrency M is equal to three. There are a total of five jobs. Each job includes a set of data objects (files, in the example of FIG. 4), which are to be migrated. There are three active jobs 402. Three is the maximum number of jobs that can be active at a given time, because M is equal to three. Each active job 402 has been assigned a medium (tape 158 in the example of FIG. 4) and a drive (tape drive 157, in the example). The files from each of the active jobs 402 are presently (and concurrently) being written to the assigned media using the assigned drive.

Non-active jobs 404, on the other hand, are not presently being written to media. Non-active jobs 404 each have a set of files that are to be migrated to media, but non-active jobs 404 cannot be made active because, at the point in time depicted in FIG. 4, the number of active jobs is equal to the migration concurrency, M, and, as discussed above, the number of active jobs cannot exceed M. Thus, non-active jobs must wait until one of active jobs 402 has completed until they can be made active and their respective files can be written to media.

In the example of FIG. 4, the number of active jobs, E, is equal to three, and the total number of jobs, J, is equal to five.

Figure 5:
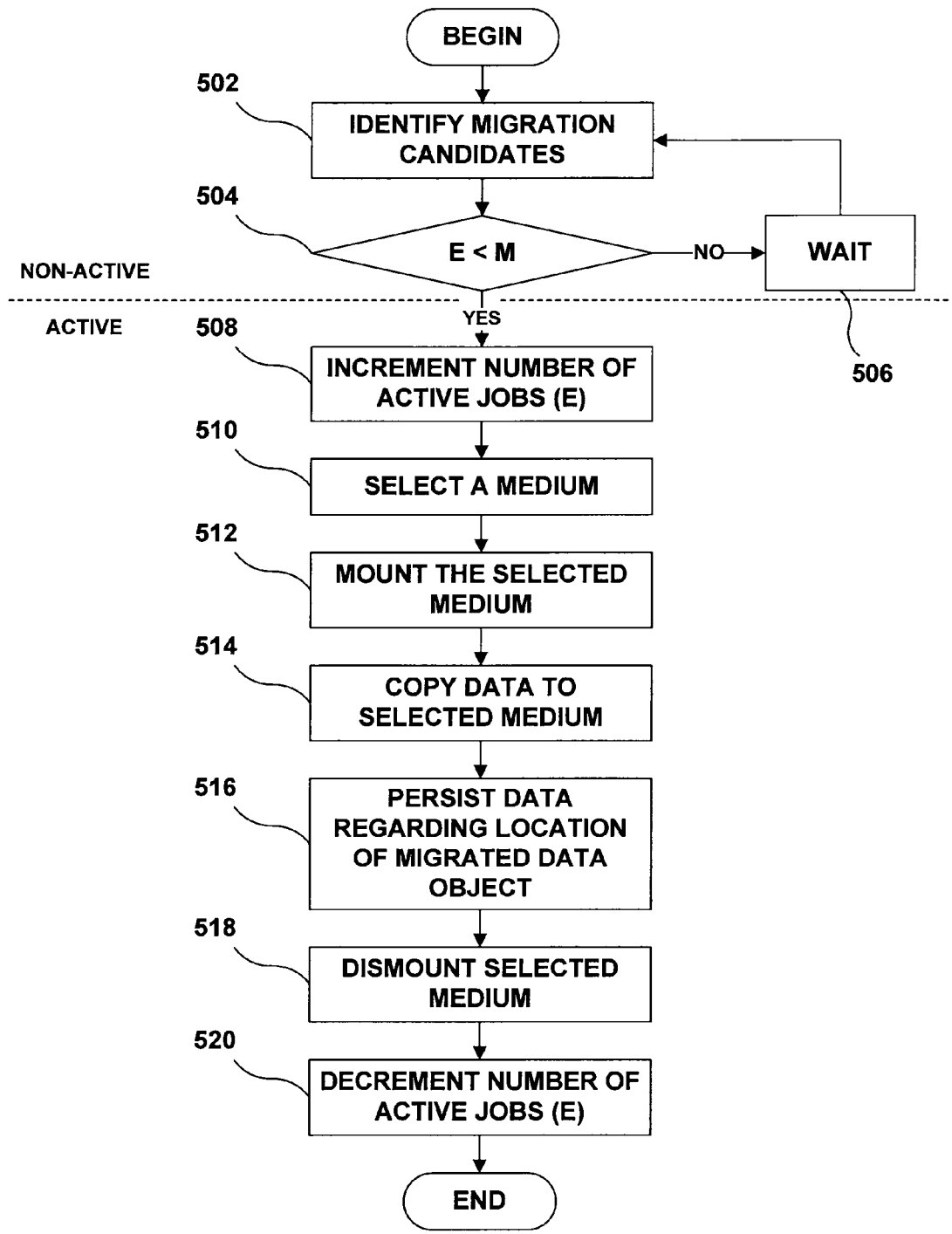
FIG. 5 is a flow diagram of an exemplary migration process.

Turning now to FIG. 5, an exemplary migration process is shown. Each "job" described is essentially an instance of the process shown in FIG. 5, and thus plural instances of that process may exist in parallel.

At the start of the process (step 502), data objects that are candidates for migration are identified. For example, where the data objects to be migrated are files on a hard disk, step 502 may comprises examining a set of files (e.g., all files stored in the C: volume) to determine which files have not been accessed for some predefined amount of time (e.g., all files that have not been accessed in the last six months). It may be convenient to start a separate instance of the process shown in FIG. 5 for each "volume." For example, in the MICROSOFT WINDOWS family of operating systems, a first instance of the process may be started for the C: volume, where step 502 identifies migration candidates only from among those files on the C: volume. In parallel, a second instance of the process is started for the D: volume and, in that instance, step 502 identifies migration candidates from among those files on the D: volume. The scope of data objects that is searched at step 502 in given instances of the process may be divided in any manner (e.g., by directory, by filename extension, etc.) without departing from the spirit or scope of the invention.

At step 504, a determination is made as to whether E (the number of presently active jobs) is less than M (the migration concurrency). E and M are global parameters that are accessible to any instance of the process shown in FIG. 5. If E≧M, then the maximum number of active jobs has already been reached, so the present job cannot be activated. In this case, the process proceeds to step 506, where it waits and then returns to step 504 to determine again whether E<M. The waiting at step 506 may be a timed wait (e.g., the system waits for 1 second before performing step 504 again). Alternatively, the waiting step may comprise the operating system's switching to another thread or task (e.g., a thread that is performing another instance of the process shown FIG. 5); in this case, the wait at step 504 completes when the operating system switches control back to the current thread.

Once it is determined that E<M (either upon an initial performance of step 504, or after one or more re-performances of step 504), the process proceeds to step 508. When the process proceeds to step 508, it has moved from its non-active phase to its active phase. At step 508, the counter that maintains the number of active jobs (E) is incremented. Next, at step 510 a medium is selected onto which to write the data identified for migration. The data to be migrated is that which was identified at step 502. A preferred process by which such a medium may be identified is more particular described below in connection with FIGS. 7-9.

Next, at step 512 the selected medium is mounted. In the case where the medium is in library 204 of juke box 202, the step of mounting a medium may be performed by computer 110's issuing an instruction to robotic arm 206 to mount the medium. In the case where the selected medium is not in library 204 (or in the case where juke box 202 is not present), step 512 may comprise prompting a human being (e.g., the system administrator) to mount the selected medium. For example, the system may display a message to the system operator (e.g., on monitor 191, shown in FIG. 1) that says: "Mount medium A on drive 2. Press <ENTER> when finished."

After the medium is mounted, the process proceeds to step 514 where the data objects identified at step 502 are written onto the medium. At step 516, the location of those objects on the medium is persisted. The exact manner in which such information is persisted depends on the environment in which the migration is performed. In one example, a file can be maintained that stores tuples having: (1) the name of the original object; (2) the media ID of the medium on which it is stored; and (3) the starting point of the file on the specified medium (e.g., the file's offset into the medium relative to the "beginning" of the medium). In another example, which is more particularly discussed below in connection with FIG. 10, the information may be persisted in the file system itself. That is, the file system may allow the original information that identified the file (e.g., its name and path) to point to a storage location that stores: (1) a flag indicating that the file has been migrated (i.e., that it is not presently stored on hard disk 141); and (2) the location to which it has been migrated. Such a configuration is especially advantageous because, when the location information can be persisted as part of the file system itself, migrated files can be accessed transparently. In such a case, the user simply asks for the file by name, and the file system determines whether the file has been migrated; if the file has been migrated, then the file system performs the operations necessary to recall the migrated file. While such an arrangement is advantageous, the location of the migrated file may be persisted in any manner without departing from the spirit and scope of the invention.

At step 518, the medium that was mounted at step 512 is dismounted. For example, when juke box 202 is present, computer 110 may issue an instruction to robotic arm 206 to dismount the medium and place it in library 204. If juke box 202 is not present (or if library 204 is full), then step 518 may comprise prompting the system administrator to dismount the medium. For example, computer 110 may display on monitor 191 a message such as: "Dismount medium A from drive 2. Press <ENTER> when finished."

At step 520, the counter that maintains the number of active jobs (E) is decremented, at which point the process is completed. It should be understood from the foregoing that other threads performing the process of FIG. 5 may be co-pending, and may be waiting to become active. Because E has just been decremented, it may now be less than M, in which case another thread (i.e., one that is re-performing the test at step 504) may now determine that it can become an active job. In this case, such other thread will now proceed to perform steps 508-520. It should also be understood that, because M can be adjusted dynamically by the system administrator (e.g., in the case where the system administrator chooses to increase or decrease the number of drives available for migration), it is not a foregone conclusion that another job will activate at this time. For example, M may have been adjusted downward during the processing of one of more jobs. In this case, E may still be greater than or equal to (the newly adjusted value of) M even after the decrementation is performed at step 520, in which case another process will not be able to activate. Whether another job activates after step 520 is performed is determined by the values of E and M, as evaluated by the instance of step 504 performed in those respective processes.

Representation of Migrated Data Object Location

At step 516 in FIG. 5, information describing the location of a migrated data object was persisted. An exemplary manner for describing the location of a data object on a medium 302 is now described.

Figure 6:
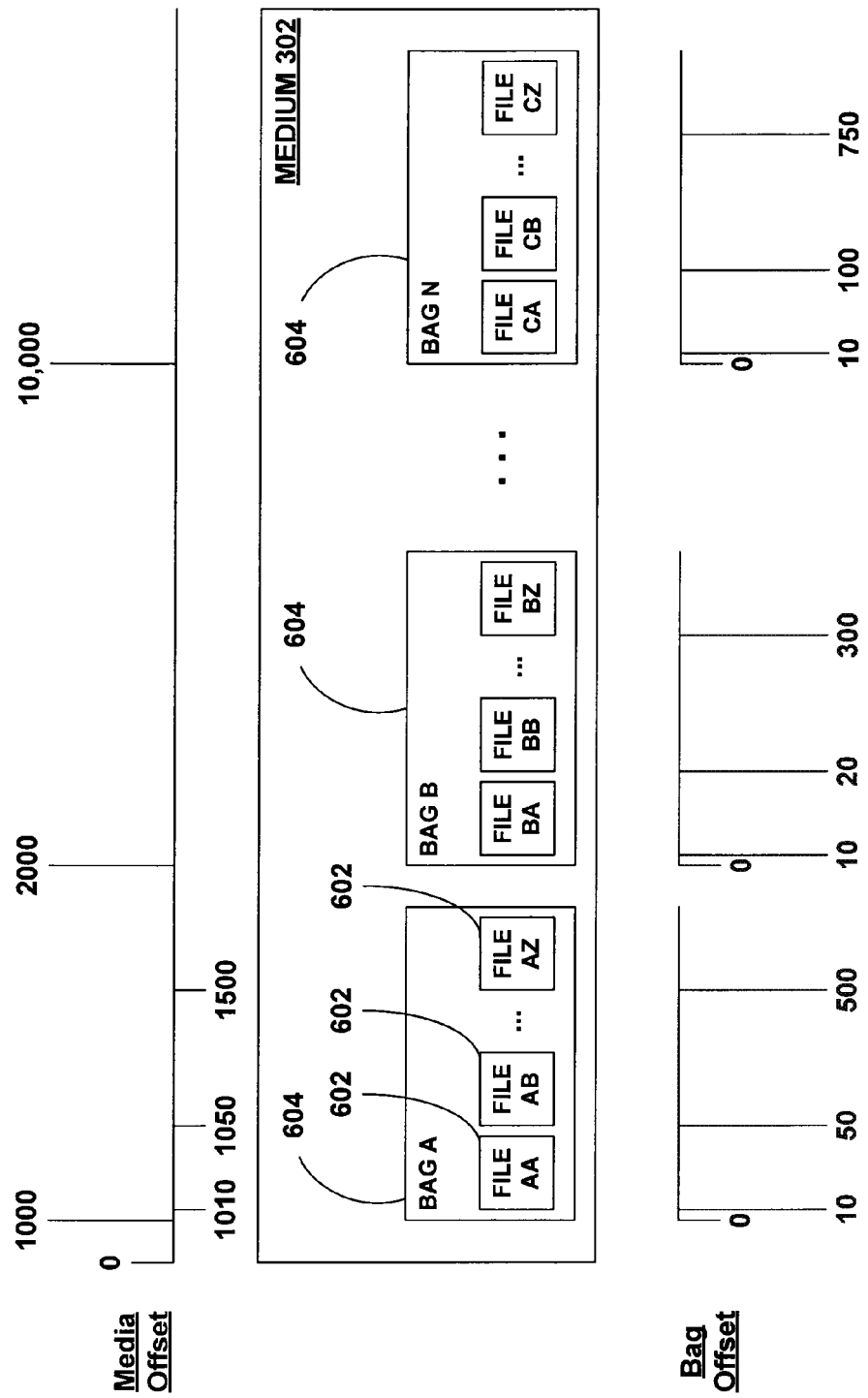
FIG. 6 is a block diagram showing an exemplary organization for data objects stored on a medium.

Referring now to FIG. 6, an example organization of data on a medium is shown. In this example, medium 302 stores files 602, although it should be appreciated that a file is merely an exemplary type of data object, and medium 302 could store any type of data objects. As noted above, files 602 may, for example, be files that were once resident on a hard disk (e.g., hard disk 141 shown in FIG. 1) but that have been "migrated" to medium 158 according to the process of FIG. 5 in order to free up space on the hard disk. It may be convenient to group files 602 into "bags" 604 for storage on medium 302. Essentially, a "bag" is an arbitrary grouping of files that are stored together. As one example, the file that are collected for migration at step 502 (e.g., all file in a given volume that have not been accessed for six months) may be collected together as a single bag 604 for storage on medium 302. Thus, if the migration process is performed nightly, then each bag 604 may represent all of the files from a given volume that were collected in a given night (e.g., all files from volume C: that were migrated on Jan. 1, 2000). It should be understood that the organization of data objects into bags 604 is merely for convenience, and data objects could, alternatively, be stored individually on medium 302 without grouping those data objects into bags 604.

The storage locations in medium 302 may have a one-dimensional linear order. That is, every storage location on medium 302 may be described by a single-number offset from a starting position. This order may be implemented physically, as in the case of sequential media such as tapes where the offset represents essentially the linear distance from the start of the tape. Alternatively, the order may be implemented "logically," as in the case of a magnetic disk in which an arbitrary "start" point is defined on each track, and in which the tracks are traversed in a predefined sequence, thereby defining an order for the entire set of storage locations on the disk. Thus, as shown in FIG. 6, every file 602 is shown as starting at a location that is described by its offset from the "beginning" of the medium, whether that "beginning" is a physical or logical beginning. In FIG. 6, the beginning of the medium is defined as offset zero. File AA begins at offset 1010, file AB begins at offset 1050, and so on. Moreover, each bag 604 can be described as beginning at a particular offset into medium 302: bag A begins at offset 1000, bag B begins at offset 2000, and so on. Thus, if the starting offset for each bag is known, a file's offset into medium 302 can be described by the identity of the bag 604 in which it is located and the file's offset into the bag. For example, file AA is in bag A, and has offset 10 into bag A. Thus, adding 1000 (the bag's offset into the medium) together with 10 (the file's offset into the bag), produces the absolute offset (1010) of file AA into the medium.

Thus, the data that is persisted at step 516 of FIG. 5 may include: (1) a media ID; (2) a bag ID; and (3) the migrated data object's offset into the bag. In this example, the offset of each bag 604 may be persisted elsewhere (e.g., in a file or database stored on hard disk 141), such that the absolute file offset can be computed from the bag ID and the file's offset into the bag. Alternatively, if migrated data objects are not organized into bags, then the data persisted at step 516 may simply include: (1) a media ID; and (2) the migrated data object's offset into the identified medium.

Selection of Medium at Step 510

As noted above in connection with FIG. 5, one step that is performed in the course of performing a migration job is the selection of a medium 302 onto which to write the migrated data. This selection is performed at step 510 in FIG. 5. A preferred technique for performing the selection of a medium at step 510 will now be described.

At the outset, it should be noted that a goal of the technique described below is to maintain the number of allocated read/write media less than or equal to the migration concurrency, M. Attempting to achieve this goal is advantageous, because having up to M available read/write media at any given point in time maximizes the potential for concurrent migration jobs. If fewer than M media are available for writing at any given time, then the potential for using M drives concurrently cannot be effectively exploited. However, if more than M media are presently available for reading and writing, then the extra cost of using additional media (i.e., the cost of purchasing a physical medium) is incurred without receiving any additional benefit in concurrency. That is, the system administrator has incurred the cost of using or purchasing one or more additional media, even though only M media can be used for writing at a given time. Moreover, if media in excess of M are allocated as read/write at a given time, it may be necessary to mount and dismount these media frequently, which increases the time for migration and decreases system performance.

It should be understood, however, that the goal of maintaining the number of allocated read/write media at a given time less than or equal to M is just that: a goal, but not a requirement. In some circumstances, such as when M media are allocated as read/write but none of these media has sufficient space to store all of the data of a particular migrated file. In such a case, it may be preferable to allocate a new medium in excess of M, rather than to divide the job among several media.

Finally, it should be noted that the goal of maintaining the number of read/write media less than or equal to M represents a trade-off among competing considerations. One the one hand, media cost money. It may be the case that all of the pending jobs could fit on a single medium. In such a case, allocating M media may increase the speed of migration, but also increases its cost, since the migration could be performed using a single medium if the ability to migrate jobs concurrently is sacrificed. On the other hand, migrating all jobs sequentially onto a single medium increases the time for migration. The technique of the present invention seeks to balance these competing considerations. It should be understood, however, that depending upon the objectives of the particular system (or its operator), different aspects of the technique can be used in different combinations, modified, or even omitted. For example, the technique described below sometimes includes waiting for an allocated medium to become non-busy, even if this causes the system to stand idle and delays migration. This serves the goal of limiting the number of media used. However, if the cost of media is of no concern and the primary goal is to minimize the time required for migration, then such waiting can be omitted and a new medium can be allocated (in excess of M). As another example, the technique described below prefers to allocate a second side of a medium whose first side is full, rather than allocating a new physical medium. This, again, decreases cost by decreasing the number of media required, but may also potentially delay recall of migrated data, since it increases the chance that the first side will unavailable for reading while the second side is used for writing migrated data. Various steps and features of the technique described below can be omitted, modified, or used in different combinations, and a non-exhaustive list of such exemplary omissions or modification are described below in connection with the various steps.

Figure 7:
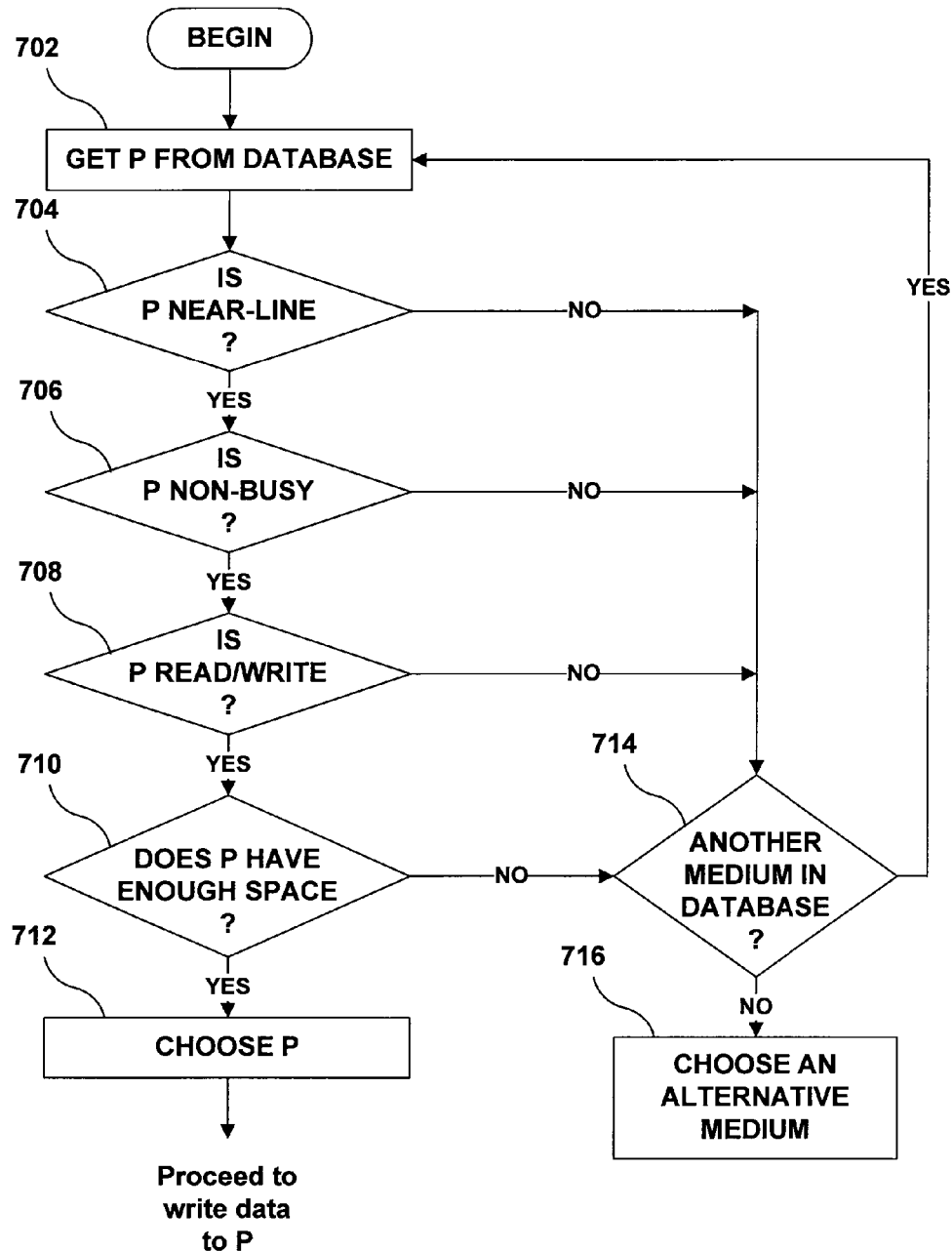
FIG. 7 is a flow diagram showing the process of selecting a preferred medium in accordance with aspects of the invention.

Turning now to a description of the technique, an attempt is initially made to identify a medium that is: (1) allocated; (2) near-line; (3) non-busy; (4) read/write; and (5) has sufficient free space to write the current file to be migrated. Selecting such a medium, if it exists, is advantageous because it is not necessary to wait for such a medium (i.e., "non-busy"), the medium can be mounted without human intervention (i.e., "near-line," if juke box 202 is present), and it has already been designated as read/write (and thus tends not to increase the number of read/write media beyond M). FIG. 7 shows the process of identifying such a medium.

Referring now to FIG. 7, at step 702 an entry 322 in database 320 (shown in FIG. 3B) is retrieved. It will be observed that, preferably, only allocated media are represented in database 320, and thus it is not necessary to determine whether the medium corresponding to entry 322 is allocated. The entry corresponds to a particular medium, P. At step 704, field 328 of entry 322 is examined in order to determine whether P is near-line. If it is determined at step 704 that P is not near-line, then P does not meet the relevant criteria (i.e., near-line, non-busy, read/write, and having sufficient available space), so the process proceeds to step 714, which is described below. If step 704 results in a determination that P is near-line, then the process continues to step 706.

At step 706, field 330 of entry 322 is examined to determine whether P is busy or non-busy. If P is busy, then P does not meet the relevant criteria, so the process continues to step 714. If P is non-busy, then the process continues to step 708.

At step 708, field 324 of entry 322 is examined to determine whether P is read/write. If P is not read/write (i.e., if the medium is read-only), then the relevant criteria are not met, so the process proceeds to step 714. If P is read/write, then the process continues to step 710.

At step 710, field 326 is examined to determine the amount of free space available on P. This free space is compared to the size of the current file to be migrated. If P does not have sufficient free space to store the file, then the relevant criteria are not met, and the process continues to step 714. If the size of the current file is less than or equal to the free space available on P, then the process continues to step 712.

If step 712 is reached, then all of the criteria (i.e., near-line, non-busy, read/write, and sufficient free space) are satisfied, so P may be chosen as the medium to use for writing a migration job. In this case, step 510 of FIG. 5 is complete, and the process of FIG. 5 proceeds to write a migration job to selected medium P.

If any of the conditions evaluated at steps 704-710 are not satisfied, then step 714 is reached. At step 714, a determination is made as to whether there are any additional media represented in database 320 that can be evaluated to determine whether they meet the relevant criteria. If there are additional media represented in database 320, then the process returns to step 702, at which another entry 322 is retrieved from database 320, where the newly-retrieved entry 322 represents another medium, P. The process of FIG. 7 is then performed for the newly-selected medium P to determine whether it meets the near-line, non-busy, read/write, and sufficient free space criteria.

If step 714 results in a determination that there are no additional media to evaluate, then there are no media represented in database 320 that meet the criteria of near-line, non-busy, read/write, and having sufficient free space. Therefore, a medium must be selected according to alternative criteria (step 716). Such criteria are discussed below in connection with FIGS. 8-9.

The following is a preferred technique for choosing a medium when there is no near-line, non-busy, read/write medium having sufficient free space (i.e., when step 716 of FIG. 7 is reached). Table 1 below shows three categories of media that can be selected:

TABLE 1

| Category | Criteria |
| --- | --- |
| A | Near-line |
|   | Non-busy |
|   | Second side free (first side full/not enough space) |
| B | Read/write |
|   | Off-line |
| C | Read/write |
|   | Busy |

A medium from category A, B, or C may be chosen as the medium to use for writing the data in a job. The particular category that is chosen depends on various circumstances, as more particularly described below in connection with FIG. 9. First, however, a process shall be described by which media are classified in either the A, B, or C categories.

Figure 8:
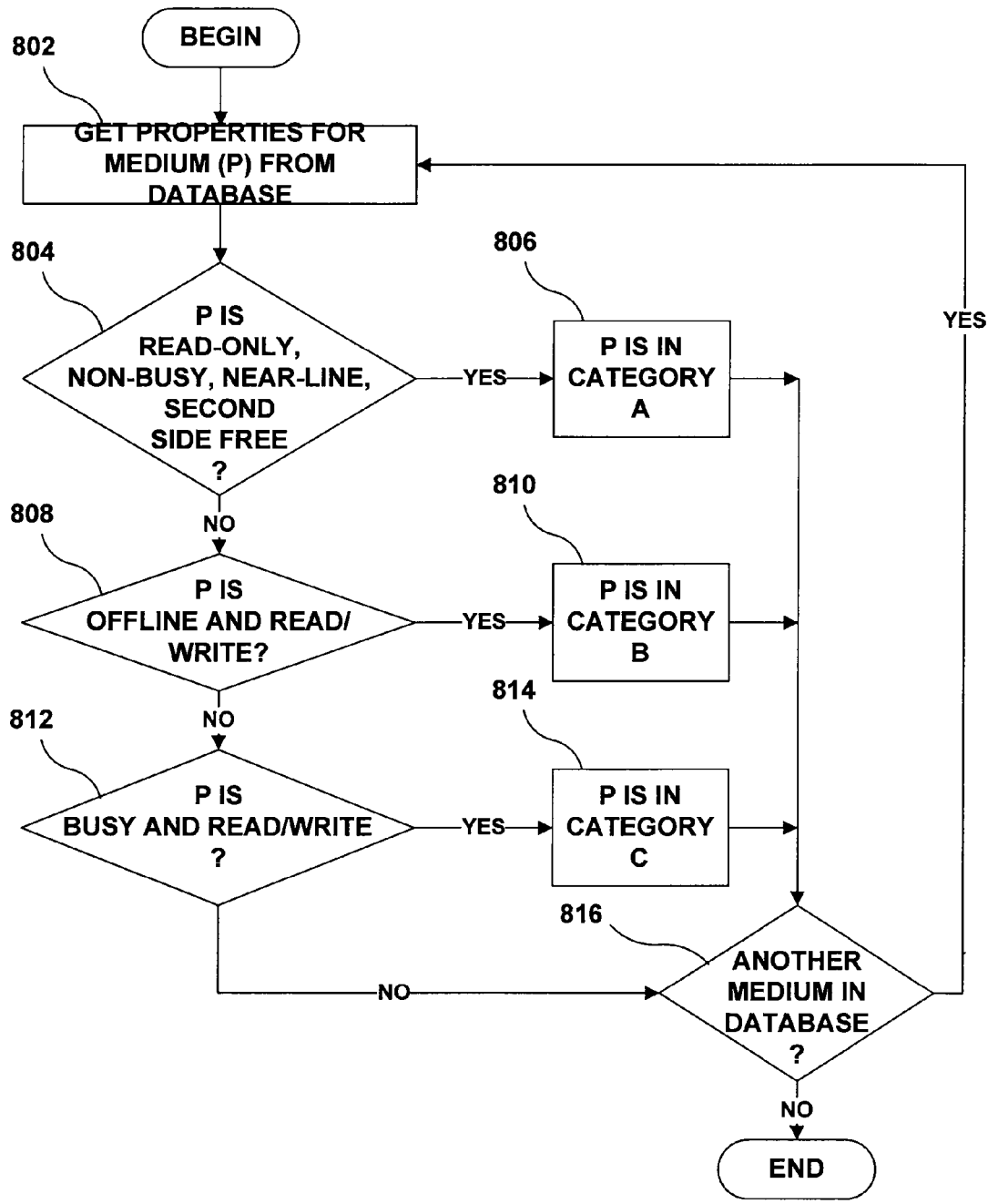
FIG. 8 is a flow diagram showing an exemplary process for the classification of media.

Referring now to FIG. 8, the process of classifying media begins at step 802, where the entry 322 for a given medium, P, is retrieved from database 320. At step 804, the entry 322 is examined to determine whether P is: (1) read-only; (2) non-busy; (3) near-line; and (4) double-sided with a free second side. If these conditions are met, then P is in category A. As previously discussed, "free" media (including free sides of double-sided media) preferably do not have entries in database 320. Thus, the process of checking the second side of P to determine whether it is free includes reading field 334 to determine the media ID of the second side of P, and then examining database 320 to determine that there is no entry for the media ID that identifies the other side of P. (It will be recalled that each side of a double-sided medium has its own media ID.)

It should be observed that if P is not a double-sided medium, then it cannot meet the condition at step 804 of having a free second side. Thus, only double-sided media can meet the criteria of step 804, and only double-sided media can be in category A.

If the condition in step 804 is not met, then P is evaluated to determine whether it is offline and read/write (step 808). If P meets these conditions, then P is classified in category B (step 810).

If the condition in step 808 is not met, then P is evaluated to determine whether it is busy and read/write (step 812). If P meets these conditions, then P is classified in category C.

After P has been classified in either category A, B, or C (step 806, 810, or 814), or determined not to meet any of the conditions tested for (following the last test at step 812), the process proceeds to step 816. At step 816, it is determined whether there are any more media represented in database 320. If there are additional media, then the process returns to step 802, where a new medium, P, is selected from the database. The process is then repeated, so that the new medium P can be evaluated according to the criteria for categories A, B, and C.

Following the process of FIG. 8, each medium in database 320 has been classified as either category A, B, or C, or has been determined not to fall into any of the three categories.

Figure 9:
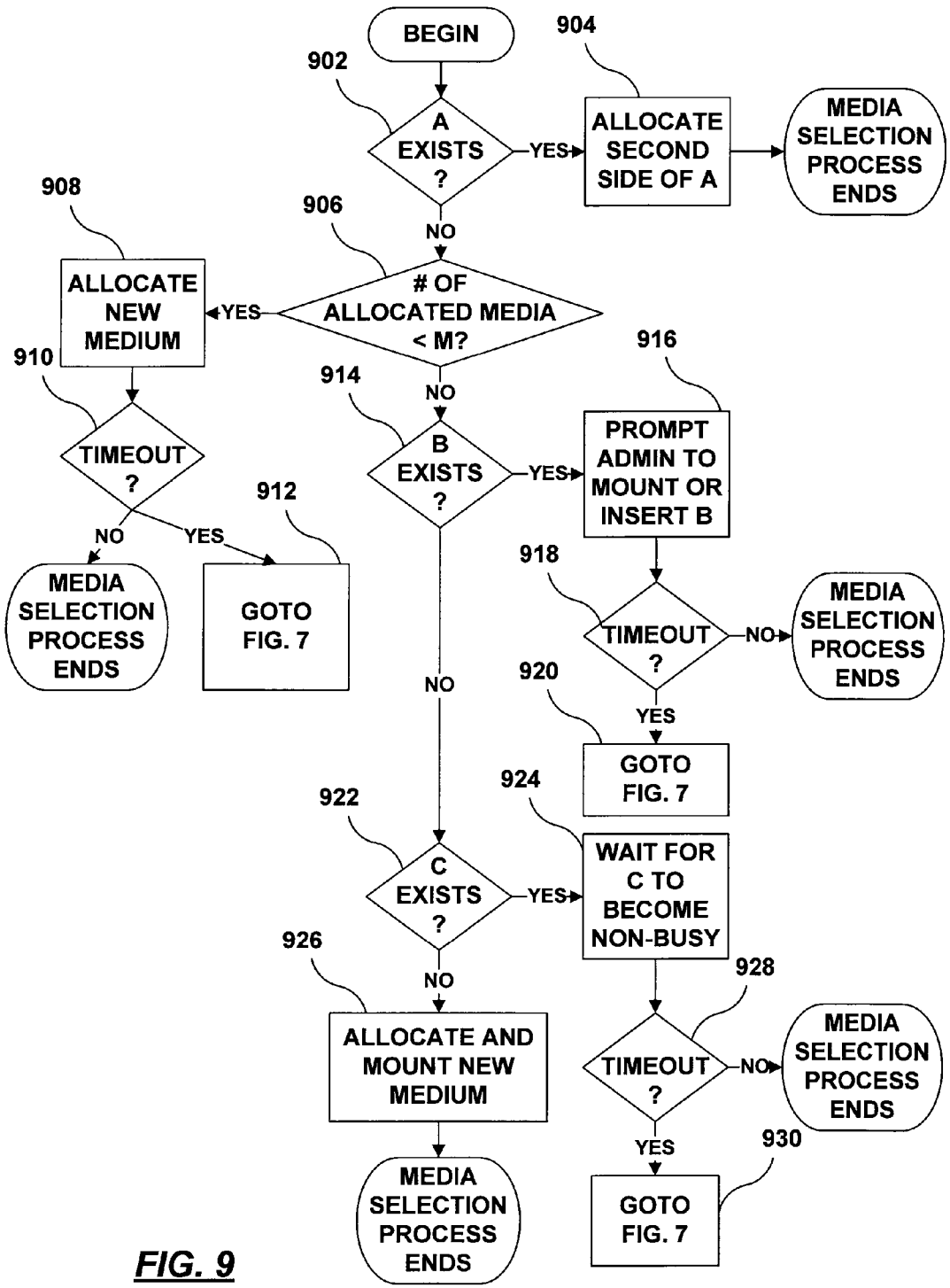
FIG. 9 is a flow diagram showing an exemplary process for selecting from among media that have been classified according to the process of FIG. 8.

FIG. 9 shows a process of selecting a medium from either the A, B, or C category. At step 902, a determination is made as to whether a medium from category A exists. If it is determined that a medium from category A exists, then that medium is selected. If there is more than one medium in category A, then one such medium is selected according to a paradigm (e.g., selecting the first (or last) medium in the category that was encountered during the process of FIG. 8). It will be recalled that a medium in category A is actually the first side of a double-sided physical medium whose second side is free (unallocated). Thus, when such a medium is determined to exist, the second side of that medium is allocated as a read/write medium and is used to write the data in the pending job (step 904).

If step 902 results in a determination that no medium in category A exists, then the process continues to step 906, where it is determined whether the current number of allocated read/write media is less than the migration concurrency, M. If M is less than the migration concurrency, then the process continues to step 908, where a new physical medium is allocated as read/write, and that medium is used to write the data in the job. If the new medium is double sided, then one side of the new medium is allocated as read/write. The new medium is then mounted. If the medium is in library 204, then the medium may be mounted simply by issuing an instruction to robotic arm 206. On the other hand, if there is no juke box 202, or the newly-allocated medium is not in library 204, then the system administrator (or other user) is prompted either to mount the medium or to insert it in the library. If such a prompt is issued, then a time limit may be set within which the medium must be inserted. If the system administrator mounts or inserts the requested medium within the time allotted, then that medium is used to write the data in the job, and media selection process terminates.

If the prompt times out (step 910), then the process of FIG. 7 is performed again (step 912). The purpose of revisiting the process of FIG. 7 is that circumstances may have changed during the timeout—i.e., as a result of the concurrent processing of other jobs, a near-line, non-busy, read/write medium with enough free space may have become free, or a medium falling into category A may come into existence. If the process of FIG. 7 locates a near-line, non-busy, read/write medium with sufficient free space, then that medium is used to write the job. If no such medium is located, then the process of FIG. 8 is performed again in order to re-classify media in database 320, and then the process of FIG. 9 is started again at the beginning (i.e., step 902). In other words, if the number of allocated media is less than M and no media in category A are available, the process of FIG. 9 does not proceed to use a medium from category B or C simply because the system administrator has failed to mount a new physical medium within the timeout. Instead, circumstances are re-evaluated to determine which media may have become available during the timeout.

It should be appreciated that waiting for the system administrator to mount a new medium (at step 910), or re-evaluating the existing media (step 912), may delay migration. As previously discussed, the decision to delay migration in this manner, rather than to use a medium from category B or C, represents a preferred balancing of the competing concerns of resource allocation. This approach is sensible, since selecting a medium from either the B or C categories will also require some delay. (In the case of a B medium, it will be necessary to wait for the medium to be mounted since such media are, by definition, off-line; in the case of a C medium, it will be necessary to wait for the medium to become non-busy.) However, if information were available that suggested that another approach was better, then the technique could be modified. For example, if it were known that, on average, busy media become non-busy in less time than it takes for a system administrator to mount an off-line medium, then a medium from category C could be selected after the timeout.

Returning now to step 906, if step 906 results in a determination that the number of allocated media is greater than or equal to M, then the process continues to step 914 to determine whether a medium from category B exists. If such a medium exists, then the system administrator is prompted to mount B or insert B into library 204 (step 916). Again, there may be a limit on the amount of time the system will wait for the requested medium to be inserted. If such a limit times out (step 918), then the process returns to FIG. 7, as described above, to re-evaluate the state of available media (step 920), proceeding again through the process of FIGS. 8 and 9, if appropriate. If a media is mounted or inserted before the timeout, then the media selection process terminates, and the newly-mounted (or newly-inserted) medium is used to write the data in the job.

Again, we note that the methodology of return to the process of FIG. 7 if a timeout occurs at step 918 represents a balancing of competing considerations. In this case, such a methodology is based on the notion that media may have become available during the timeout, and locating such media may be faster than waiting for a medium in category C to become non-busy. The process of re-evaluating media may take place relatively quickly, so this is a sensible action to take. However, if it is known that busy media tend to become non-busy relatively quickly (e.g., in a few seconds), then the process of FIG. 9 could be modified such that a timeout at step 918 results in using a medium from category C.

Additionally, it should be noted that, inasmuch as media in category B are, by definition, off-line, using a medium from category B necessary involves some delay; even if the system administrator is available, he must physically locate and retrieve the medium from an offline location. Thus, using a medium from category B may be preferable to allocating a new medium because, if step 918 is reached, then it has already been determined (at step 906) that the number of read/write media is equal to or greater than M, and, as discussed above, it may not be desirable to have read/write media in excess of M. However, the delay of waiting for an off-line medium in the B category is unacceptable, then the technique can be modified by simply allocating a new medium that is already stored in library 204, rather than attempting to mount a medium from category B (if juke box 202 is present, and an unallocated medium is, in fact, in library 204).

Returning now to step 914, if there is no medium in category B, then the process continues to step 922 to determine whether a medium in category C exists. If such a medium exists, then the system waits for it to become non-busy (step 924). As noted above, there may be more than one medium in category C. If there are plural media in category C, then step 924 may include tracking the status of all such media to determine which one becomes non-busy first. Alternatively, a particular medium in category C may be identified at the start of step 924, and the system may wait for that particular medium to become free regardless of whether the other media in category C become non-busy. If the wait times out (step 928), then the process of FIG. 7 is performed again (step 930). Once a medium in category C becomes non-busy, the medium selection process terminates and that medium is used to write the data from the job.

Returning to step 922, if there are no media in category C, a new medium is allocated and mounted at step 924 (including prompting to mount the medium or insert it in library 204, if necessary). At that point, the medium selection process terminates, and the new medium is used to write the data from the job.

Thus, the process of FIGS. 7-9 result in the selection of a medium for use at step 510 of FIG. 5. The selected medium may then be used to write the data from the job.

Exemplary File Management Environment

Figure 10:
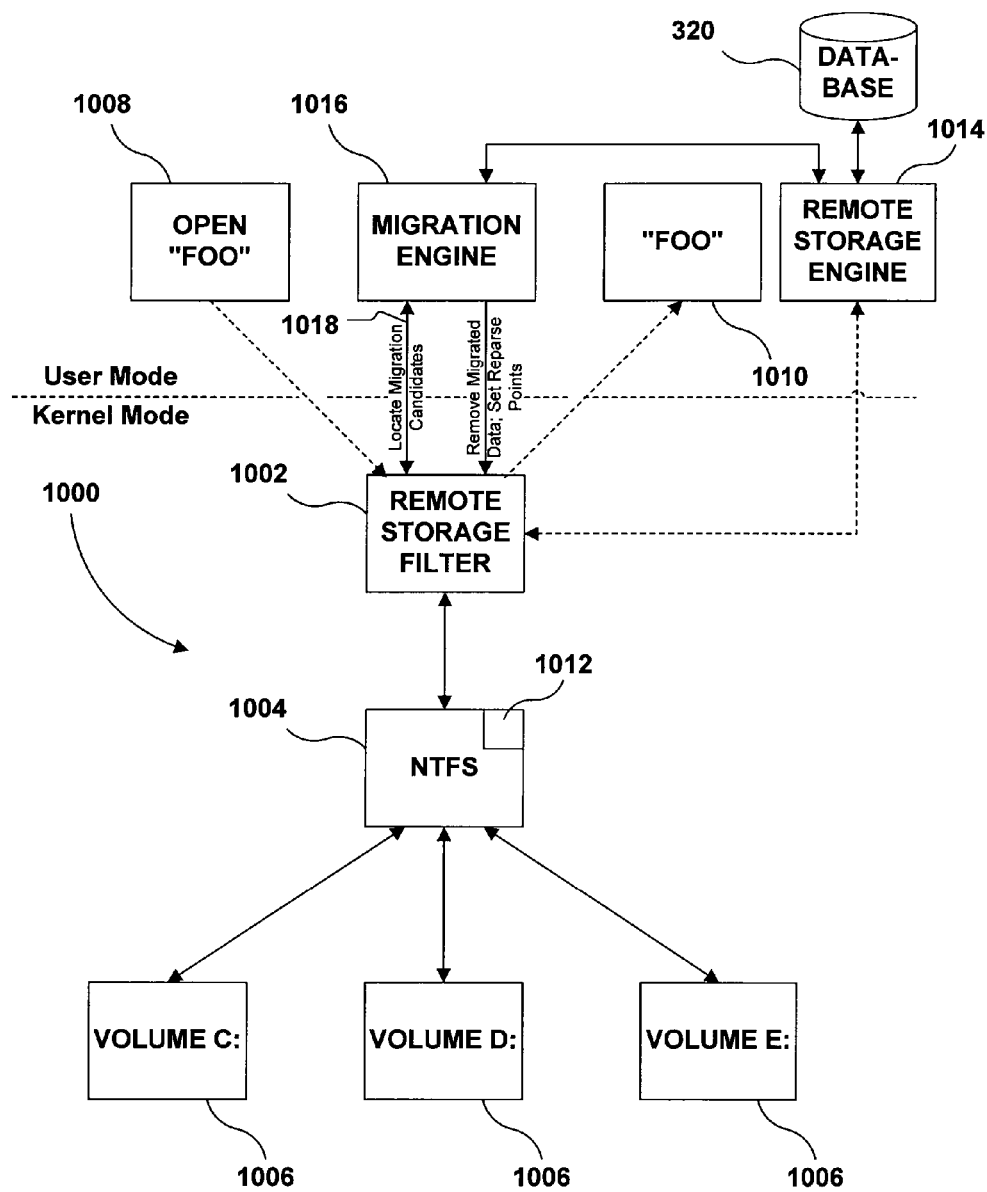
FIG. 10 is a block diagram of an exemplary file management environment in which the invention may be embodied.

While the present invention may be used to store data on media in any context, a particularly useful environment in which the invention may be embodied is a file management environment, in which the migrated data is a set of files stored on the file system. FIG. 10 shows such an environment in which the invention may be incorporated.

Referring now to FIG. 10, a file management environment 1000 (which may be part of an operating system, such as operating system 134 shown in FIG. 1) comprises a remote storage filter 1002, a file system manager 1004 (of which NTFS, depicted in FIG. 10, is an example), and one or more volumes of files 1006. Volumes 1006 may, for example, be plural hard disks or separate partitions of a single hard disk. File management environment is organized in a hierarchy: requests and instructions are received by file management system from the user level by way of remote storage filter 1002. Remote storage filter 1002 receives requests for files (such as request 1008 to open a file called "foo," depicted in FIG. 10). Remote storage filter 1002 passes the request to file system 1004, which, in turn, locates the requested file on the appropriate volume 1006. File system 1004 includes data or logic that is able to identify the particular volume 1006 on which the requested file is stored. File system 1004 may then pass the file 1010 retrieved from volume 1006 back to user mode by way of RS filter 1002. The file is then made available in user mode.

File system 1004 may maintain a set of reparse points 1012. A reparse point is essentially a flag and a storage location for arbitrary data. When a request for a file is received (e.g., a request for the file "foo"), file system 1004 may check to determine whether a reparse point is set for that file. If there is no reparse point 1012 for the file, file system 1004 locates the file in volumes 1006. If a reparse point 1012 is set for the file, then file system 1004 indicates this fact back to remote storage filter 1002, along with whatever arbitrary data is associated with the particular reparse point. The indication that reparse point 1012 has been set serves as a flag to remote storage filter 1002 indicating that the requested file is not located in volumes 1006. The arbitrary data associated with reparse point 1012 may be a "stub" that indicates where the file is stored in remote storage—e.g., a media ID, a bag ID, and an offset. Remote storage filter 1002 then communicates with remote storage engine 1014, which receives the information identifying the location of the requested file, retrieves that file from media using a physical remote storage device (e.g., juke box 202) and provides that file back to remote storage filter 1002. Remote storage filter then takes the file received from remote storage engine 1014 and provides it to user mode. The process of hitting a reparse point 1012 and retrieving a file from remote storage in response thereto may, in fact, take place "transparently." That is, when a user issues a request 1008 for a file, the components of file management environment 1000 may act together "behind the scenes" such that the user is unaware of whether the file was received from volumes 1006 or from a remote storage medium (except, of course, that retrieval from remote storage may take a longer time).

The features of the present invention may be embodied in a migration engine 1016 that is part of file management environment 1000. Migration engine 1016 is a software component that actuates and controls the migration process. Migration engine 1016 may be a separate software component from remote storage engine 1014 (as depicted in FIG. 10), or they may be a unified software component. Essentially, migration engine 1016 includes the logic that performs the processes of FIGS. 5, 7, 8, and 9. For example, migration engine 1016 may communicate with file system 1004 (through remote storage filter 1002) in order to locate migration candidates (step 502 in FIG. 5). Such communication is indicated by arrow 1018. As a specific example, migration engine may contain logic that seeks to locate all files on a particular volume 1006 that have not been accessed for at least six months, and the may ask file system 1004 to provide a list of files on a volume 1006 (e.g., volume C) along with the date on which each file was most recently accessed. Migration engine 1016 may then evaluate the information received and identify files to be migrated based on that data, and then may request the identified files themselves so that the data can be collected into a migration job. Migration engine 1016 also includes the logic that performs the selection of media, and that actually sends to the media drives the data to be migrated. Migration engine 1016 may include, or communicate with, database 320 (whose structure is shown in FIG. 3B) so that it can appropriately manage media 302 in accordance with the technique discussed above.

Migration engine 1016 also includes logic that sets reparse points 1012 in file system 1004, and provides the location of the migrated files so that such locations can be included as data in reparse points 1012. The setting of a reparse point 1012 is an example of persisting the location data for the migrated file (step 516). For example, after writing the migrated files to media, migration engine 1016 may set reparse points 1012 for each of the migrated files, and may provide the media ID and offset (and bag ID, if jobs are organized into bags) to file system 1004 to be included in the data portion of reparse points 1012. Persisting the location of the migrated files in this manner is particularly advantageous because it leverages the reparse points 1012 of file system 1004 such that migrated files can be retrieved "transparently" by remote storage engine 1014 in the manner described above.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed:

1. A system comprising a processor, for storing data on media, the system comprising:
    a media management module, residing on the processor, which communicates with a database that stores attributes of a plurality of media, and which selects media for writing in accordance with the attributes stored in said database, said media management module designating a quantity of said plurality of media as being in a writable state, said quantity being equal to a concurrency value; and
    a migration module which communicates with a storage device, said storage device including a plurality of drives which write data to said media, said migration module receiving an indication of a selected medium from said media management module and writing data to the selected medium using said storage device,
    said plurality of media comprising double-sided media, each side of said media being designatable as being in either a writeable state or a non-writeable state, and the media management module further comprises logic which selects a medium based on which of said plurality of media has a side in the non-writeable state.

2. The system of claim 1, further comprising:
    a selection module which communicates with a data object storage system and which selects data objects from said data object storage system to be written to said media.

3. The system of claim 1, wherein said selection module selects data objects based on the time said data objects were most recently accessed.

4. The system of claim 1, further comprising:
    a persistence module which receives from said migration module the location at which said data is stored on said media, and which stores the location of said data in a memory location.

5. The system of claim 1, wherein said concurrency value is equal to the number of drives in said storage device.

6. The system of claim 1, wherein said storage device comprises a library which stores media and a robotic mechanism which mounts media stored in said library on said drives, and wherein said media management module further comprises logic which selects a medium based on which of said plurality of media is located in the library.

7. A method for storing data on media, the method comprising:
    determining to store data, the data comprising a plurality of files;
    determining a concurrency value, the concurrency value being a maximum number of a plurality of media that may be written to concurrently;
    determining that the concurrency value is greater than a number of the plurality of media currently being written to;
    determining a medium of a plurality of computer-readable storage media based on attributes of the plurality of media stored in a database, the medium not being currently written to;
    writing the data to the medium;
    storing an indication of an offset of the data within the medium;
    storing an indication of an offset of a first file of the plurality of files within the data within the medium;
    storing an indication of the medium; and
    retrieving the first file based on the offset of the data within the medium, the offset of the first file within the data, and the indication of the medium.

8. The method of claim 7, wherein the concurrency value is less than the number of media in the plurality of computer-readable storage media.

9. A computer-readable storage medium bearing computer-readable instructions that, when executed on a computer, cause the computer to perform operations comprising:
    determining to perform a first job, the first job comprising storing data in one of a plurality of storage media;
    determining a concurrency value, the concurrency value being a maximum number of jobs that may be performed concurrently;

determining that the concurrency value is greater than a number of jobs being performed concurrently;

incrementing the number of jobs being performed concurrently;

determining a first medium of the plurality of storage media based on attributes of the plurality of storage media stored in a database by determining that the first side of the medium is not free, and by determining that the medium ID of the second side is not stored in the database;

performing the first job with the first medium the first medium having a first side and second side, each of the first side and the second side having a medium ID; and decrementing the number of jobs being performed concurrently.

10. The computer-readable storage medium of claim 9, further bearing computer-readable instructions that, when executed on the computer, cause the computer to perform operations comprising:

changing the concurrency value.

11. The computer-readable storage medium of claim 9, wherein determining a first medium of the plurality of storage media based on attributes of the plurality of storage media stored in a database comprises:

determining the first medium of the plurality of storage medium based on the first medium to be non-busy, readable and writeable, and to have sufficient free space to store the first job.

12. The computer-readable storage medium of claim 11, wherein determining a first medium of the plurality of storage media based on attributes of the plurality of storage media stored in a database comprises:

Determining the first medium of the plurality of storage medium based on the first medium to be allocated and near-line.

13. The computer-readable storage medium of claim 9, wherein performing the first job with the first medium comprises:
performing the first job with the second side of the first medium.

* * * * *